United States Patent [19]
Snider et al.

[11] Patent Number: 5,542,240
[45] Date of Patent: Aug. 6, 1996

[54] WATER CRAFT FOR REDUCING AQUATIC PLANT INFESTATION

[76] Inventors: Trent G. Snider; Danny G. Snider, both of P.O. Box 310, Gulf Hammock, Fla. 32639

[21] Appl. No.: 439,736

[22] Filed: May 12, 1995

[51] Int. Cl.$^6$ .................................................. A01D 44/00
[52] U.S. Cl. .................................................. 56/8
[58] Field of Search ...................................... 56/8, 9

[56] References Cited

U.S. PATENT DOCUMENTS

| | | | |
|---|---|---|---|
| 3,469,377 | 9/1969 | Hatton | 56/9 |
| 3,541,769 | 11/1970 | Grinwald | 56/9 |
| 3,611,680 | 10/1971 | Hendrickson | 56/9 |
| 3,706,185 | 12/1972 | Chaplin | 56/9 |
| 3,866,396 | 2/1975 | Meyer | 56/9 |
| 4,196,566 | 4/1980 | Donnelley | 56/8 |
| 4,507,909 | 4/1985 | Kelpin, Sr. | 56/9 |
| 4,520,616 | 6/1985 | Stewart et al. | 56/9 |
| 4,616,588 | 10/1986 | Caddick | 114/162 |
| 4,638,621 | 1/1987 | Stewart, III et al. | 56/9 |
| 5,069,023 | 12/1991 | Prochaska, Sr. et al. | 56/9 |
| 5,110,311 | 5/1992 | Wilkerson | 440/37 |
| 5,142,849 | 9/1992 | Amimoto et al. | 56/8 |
| 5,161,354 | 11/1992 | Sygen et al. | 56/8 |
| 5,379,709 | 1/1995 | Wilkerson | 114/61 |

OTHER PUBLICATIONS

Retador Brochure, SORE, Cia. Constructora Hidalgo, S.A. de C.V. illustrating a "Mobile Unit for Removing Water Lilies and Floating Aquatic Weeds", date unknown.

Bureau of Aquatic Plant Management, Tallahassee, FL, "Weed Alert! Waterhyacinth", date unknown.

*Primary Examiner*—Terry Lee Melius
*Attorney, Agent, or Firm*—Saliwanchik & Saliwanchik

[57] ABSTRACT

The water craft of this invention is capable of efficiently reducing the level of aquatic plant infestation of waterways by mulching or otherwise finely chopping plants growing on the surface of the waterway as the water craft moves through the water. Preferably, the water craft is capable of rapidly moving through plant infested waters while rapidly mulching the infesting plants. In one embodiment, the water craft is a boat equipped with an intake port and an exhaust port, with at least one and preferably several arrays of cutting blades disposed between said intake and said exhaust ports such that any solid matter is mulched or cut into tiny pieces upon passage from said intake port on its way to said exhaust port, said intake port being disposed so as to allow plant infested water to enter the boat and come into contact with said array or arrays of cutting blades.

10 Claims, 6 Drawing Sheets

WATER CRAFT FOR REDUCING AQUATIC PLANT INFESTATION

BACKGROUND OF THE INVENTION

I. Field of the Invention

This invention relates to a water craft capable of efficiently reducing infestation in bodies of water by aquatic plants and the like.

II. Information Disclosure

Certain aquatic plants grow so prodigiously as to create a problem for other aquatic life forms and for navigation by man. There have been several attempts to produce water crafts which control such uncontrolled and harmful growth. Examples of such efforts are described in U.S. Pat. Nos. 3,469,377 ('377); 3,541,769 ('769); 3,611,680 ('680); 3,706,185 ('185); 3,866,396 ('396); 4,196,566 ('566); 4,520,616 ('616); 4,638,621 ('621); 4,616,588 ('588); 5,142,849 ('849); 5,110,311 ('311); 5,379,709 ('709).

The '377 patent describes a mower for harvesting seaweed. It is also suggested that waterhyacinth could be harvested using this apparatus. However, the principal use of this machine, regardless of the type of vegetation attacked, is to harvest rather than destroy.

The '769 patent relates to a diverter which can be attached to an aquatic harvester. This diverter is not a vehicle which itself can be used to clear waterways.

The '680 patent relates to a machine for harvesting vegetation from waterways comprising a raking means, a shredder means, and a means for disposing vegetation after it has been shredded. This machine is not designed so as to be able to clear large areas of water quickly.

The '185 patent describes an apparatus for removing marine growths and roots comprising injection of water and compressed air below the root system followed by removal of the plants.

The '396 patent describes a device for harvesting aquatic vegetation. The forward portion of the apparatus is equipped with a submerged rotating drum having cutting edges for cutting submerged plants. The cut plants are then sucked into an internal processing compartment where they are further cut and subsequently dried and packaged.

In the '566 patent, a water craft was described having two shafts projecting from the vehicle, with a circular cutting blade mounted at the distal end of each shaft such that the two blades interlock. The blades cut aquatic plants and their roots while at the same time operate as the sole means for propelling the vehicle forward.

The '616 patent describes a method and system for conditioning and removing aquatic plants. The problem of waterhyacinth infestation of waterways is noted in this patent and a solution thereto is suggested which comprises using a water craft having at least one rotatable drum to condition plants so as to be uniformly distributed across a body of water, followed by removal of the plants using a buoyant, flexible material to surround and reel in the plants. This method is slow and expensive, as the harvested plants have to be gathered and disposed of.

The '621 patent describes a method and system for processing aquatic plants comprising a shore mounted harvesting and chopper means, primarily for preparing animal feed.

The '588 patent describes a navigable water craft for removal of weeds from the beds of waterways. The craft is designed for small scale harvesting of, and not destruction of vegetation.

The '849 patent describes an aquatic plant cutting apparatus and aquatic plant recovery boat equipped with the apparatus. The apparatus comprises a submerged cutting means outside of a water craft equipped with the cutting means.

The '311 patent describes an air boat adapted to plow through slime- or plant-infested waters. The boat is not adapted to mulch vegetation.

The '709 patent describes an amphibious vehicle for cleaning swamps and marshlands. The vehicle has a pontoon hull and tracks. The vehicle is not adapted to rapid clearance of waterways infested with water-borne plant matter.

Other references are mentioned in several of these patents.

In general, known water craft for removal or processing of aquatic biomatter are slow vehicles, severely limited in the amount of acreage that can be cleared in a short amount of time. With quickly replicating plants, such as waterhyacinths, this presents a serious shortcoming.

One example of such a slow-moving vehicle is the RETADOR, model P-140, available through SORE CIA Constructora Hidalgo, S.A. de C.V., Autopista Mexico-Queretaro No. 2222-3 er. Piso-Colonia Valle Verde, Tlalnepantla, Estado de Mexico-C.P. 54040 (tel. 398-78-55 or 398-78-66). This machine is a tractor-like vehicle having a 140 h.p. diesel engine. According to the manufacturer's brochure describing the RETADOR, the machine travels at an average speed of 1.24 miles/hour while clearing water lilies at a maximum density of 176.4 lb/10.764 square feet. A shredding capacity of 1.97 acres/hour, equivalent to 705.28 tons per hour, the RETADOR sits on floaters, or pontoons, and is propelled by revolving paddle wheels mounted on each side of the machine. The machine is equipped with cutting blades mounted by means of hydraulic jacks at the bow end of the boat.

Waterhyacinths are aquatic weeds that can double in surface area in 7 days during their growing season, growing to a density in some areas of up to 200 tons per acre. Since these plants are approximately 95% water, handling and removal of this biomass is expensive. In Florida, where waterhyacinth infestation has become a major problem in the waterways, control by chemical means has been attempted. This requires constant maintenance and potential toxicity to fish and other wildlife. See the publication of the Bureau of Aquatic Plant Management, Technical Services Section, 3917 Commonwealth Boulevard, Tallahassee, Fla. 32399, tel. 904-487-2600, entitled: "Weed Alert! Waterhyacinth (*Eichhornia crassipes*)." The cost of controlling waterhyacinth in Florida alone is estimated at $2.5 million annually. Cost estimates for different types of weeds and methods of control are as follows, using 1985 dollar values:

TABLE 1

Average aquatic weed control costs per acre for mechanical and herbicide control of floating and submersed vegetation. Cost estimates based on expenditures reported to the DNR and reported in the literature.

| Type of Weed Control | Targeted Weed Species | Location of Weed Control | Average Costs per Acre Using 1985 Dollars[a] |
|---|---|---|---|
| Large mechanical harvester | Hydrilla | Florida | $733.00[b] |
| Large mechanical | Water- | Florida | $4,649.00[c] |

TABLE 1-continued

Average aquatic weed control costs per acre for mechanical and herbicide control of floating and submersed vegetation. Cost estimates based on expenditures reported to the DNR and reported in the literature.

| Type of Weed Control | Targeted Weed Species | Location of Weed Control | Average Costs per Acre Using 1985 Dollars[a] |
| --- | --- | --- | --- |
| harvester | hyacinth | | |
| Large mechanical harvester | Eurasian watermilfoil | Northeast United States | $301.00[d] |
| Herbicide | Hydrilla | Florida | $288.00[e] |
| Herbicide | Water-hyacinth | Florida | $60.00[e] |

[a]Estimated using the Industrial Commodities Producer Price Index, Bureau of Labor Statistics, United States Department of Labor.
[b]Average per acre cost based on 24 Florida locations.
[c]Average per acre cost based on 23 Florida locations.
[d]Average per acre cost based on 6 NE United States locations.
[e]Average per acre cost based on statewide expenditures reported to the Florida Department of Natural Resources.

Accordingly, there remains a pressing need for more efficient means for controlling infestation of water bodies by waterhyacinths and other weeds.

In the present invention, the limitations of known water craft and the problems associated with chemical control of aquatic weeds are overcome by a new water craft that efficiently removes plant infestation.

BRIEF SUMMARY OF THE INVENTION

The water craft of this invention is capable of efficiently reducing the level of aquatic plant infestation of waterways by mulching or otherwise finely chopping plants growing on the surface of the waterway as the water craft moves through the water. Preferably, the water craft is capable of rapidly moving through plant infested waters while rapidly mulching the infesting plants. In one embodiment, the water craft is a boat equipped with an intake port and an exhaust port, with at least one and preferably several arrays of cutting blades disposed between said intake and said exhaust ports such that any solid matter is mulched or cut into tiny pieces upon passage from said intake port to said exhaust port, said intake port being disposed so as to allow plant infested water to enter a mulching chamber disposed within the hull of the boat and to come into contact with said array or arrays of cutting blades. In another embodiment of this invention, said intake port, said exhaust, and said intermediate mulching chamber are disposed between the hulls of two water craft, thus expanding the surface area accessible to the mulching blades of the claimed water craft. In another embodiment of this invention, either the single or double hull design of the water craft is equipped with an air-driven propulsion means, such as an airboat driven by a large fan. The subject invention also pertains to a method of controlling waterhyacinth by using the described water craft in a body of water where infestation of hyacinth is present.

DETAILED DISCLOSURE OF THE INVENTION

Figure 1A:
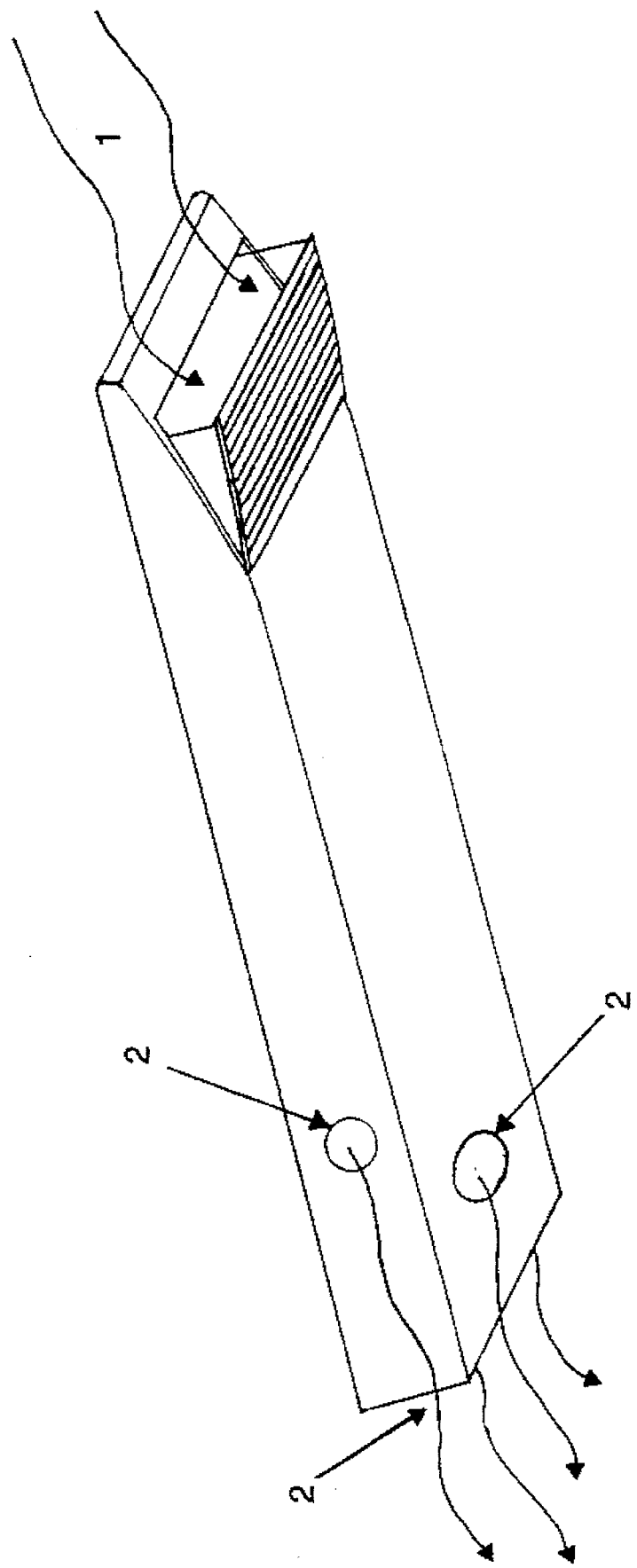
FIG. 1A is a bottom view of the hull showing one embodiment of intake port as a loader door assembly, and one embodiment of the exhaust port.
Figure 1B:
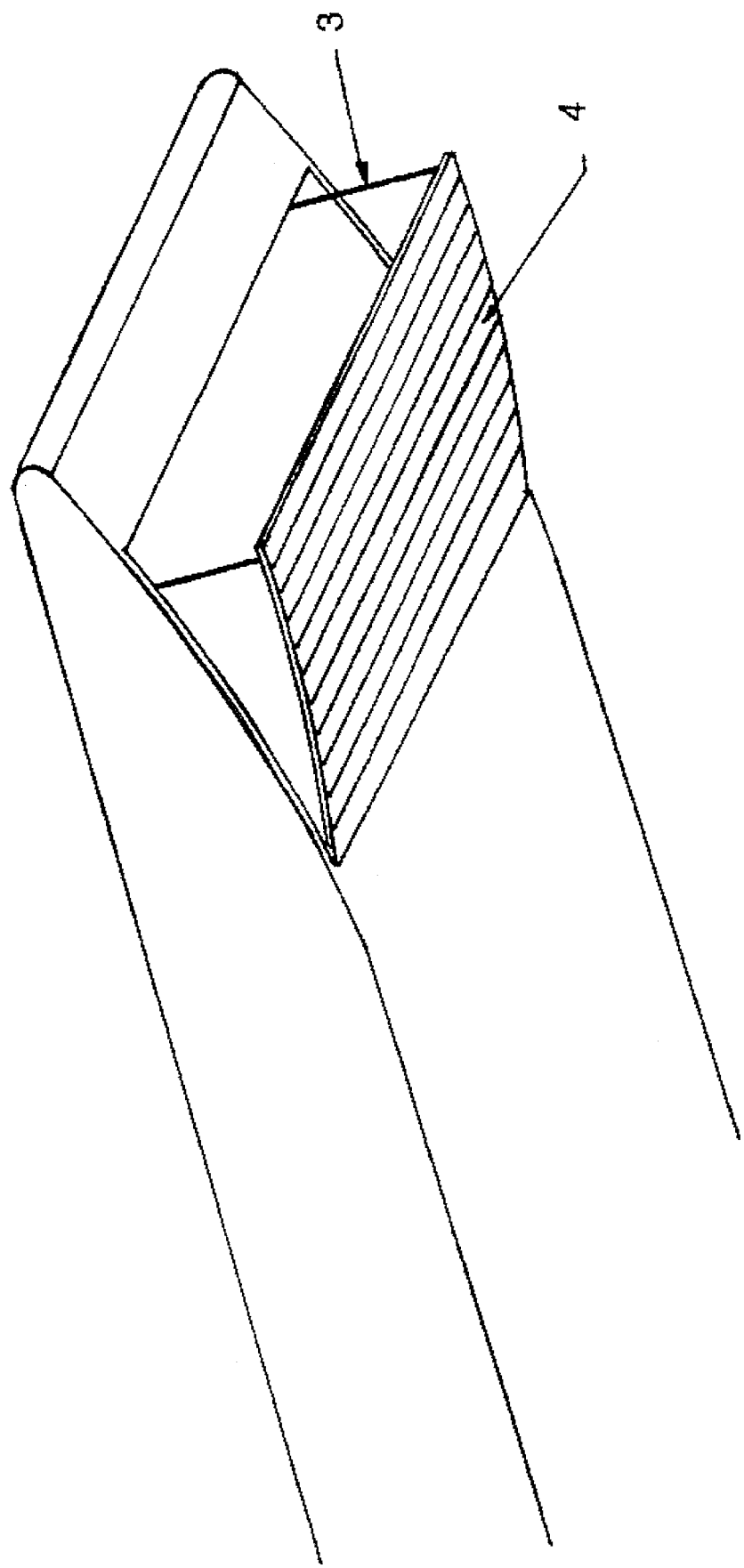
FIG. 1B is a bottom view of the hull showing a detail of the loader door assembly.
Figure 2A:
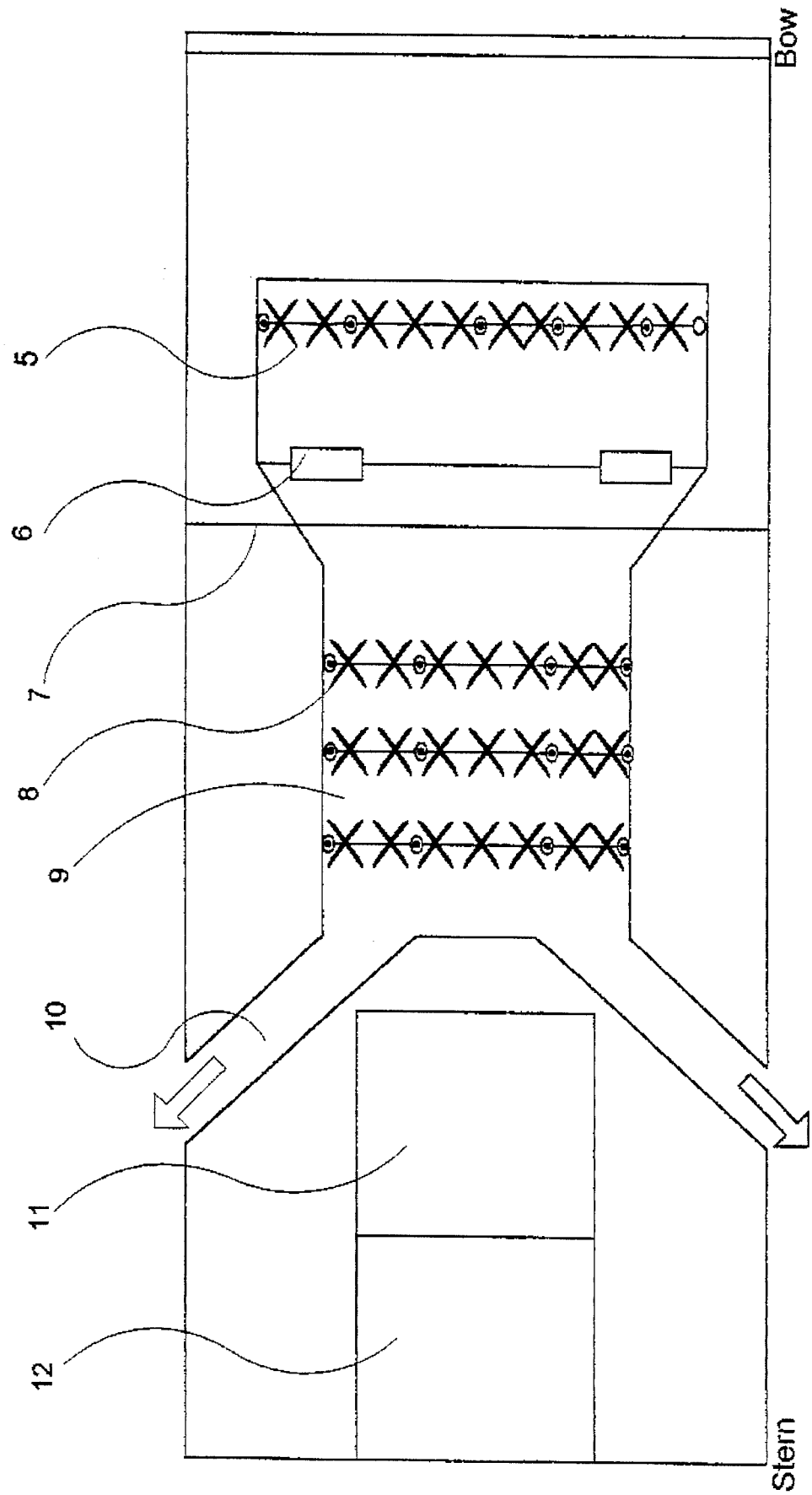
FIG. 2A is a top view of the water craft showing one embodiment of the cutting blade arrays, the intake port and the exhaust ports.
Figure 2B:
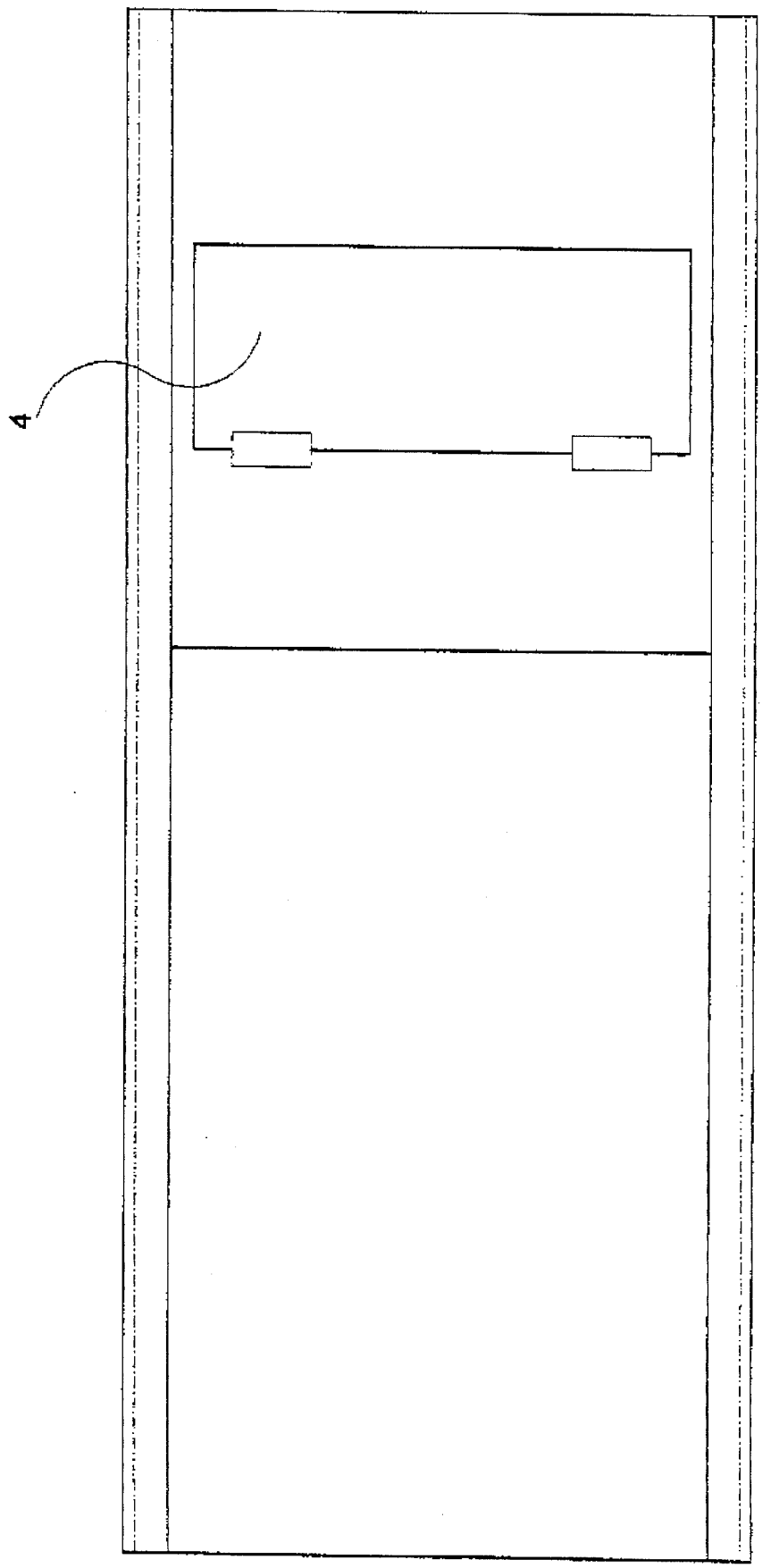
FIG. 2B is a bottom view of a one embodiment of the water craft showing a closed intakes port.

The water craft of this invention is capable of efficiently reducing the level of aquatic plant infestation of bodies of water by mulching or otherwise finely chopping plants growing on or near the surface of the waterway as the water craft moves through the water. Preferably, the water craft is capable of rapidly moving through plant infested waters while mulching the infesting plants.

Referring now to FIGS. 1A, 1B, 2A, and 2B, in one embodiment, the water craft is a boat equipped with an intake port 1 showing the direction of water and plant flow, and an exhaust port, 2. Disposed between said intake and exhaust ports, is an array of cutting blades 5, and preferably several such arrays, 8, situated inside a mulching chamber, 9. The arrays of cutting blades pass though the water as it flows from the intake to the exhaust port such that any solid matter is mulched or cut into tiny pieces. The intake port is disposed so as to allow plant infested water to enter the mulching chamber of the boat and come into contact with the cutting blades.

Referring to FIGS. 1A–1B and 2A–2B, in one embodiment of this invention, the intake port 1 has the design of a loader door 4 at the bow end the hull. In this embodiment, the loader door is lowered into the plant infested water and locked into place by a locking means 3 so as to prevent the door from being forced closed or displaced downward as the boat proceeds through the water. The door is pivotally secured to the bottom of the boat through a hinge or other pivotal securing means 6. Immediately behind the pivotal means 6 securing the loader door 4 is the bulkhead 7 of the boat. Naturally, those skilled in the art will recognize that the intake port 1 may have a design other than the loader door 4 shown in FIG. 1. Thus, for example, the intake port may include some form of raking means, such as, for example, that described in U.S. Pat. No. 3,611,680, herein incorporated by reference, which induces aquatic plants to accumulate and enter the intake port, thus enabling the boat to clear an even larger surface area than the path along which it is traveling. Alternatively, or in addition, the intake port may be comprised of a hopper such as is described in U.S. Pat. No. 3,611,680.

Toward the stern end of the craft, on either or both sides of the boat, an exhaust port 2 is provided so that water and plants entering the intake port 1 and which has passed through the cutting blades 5 and 8, is discharged as the boat moves forward. The combined force of the water and rotating blade arrays forces the water and mulched debris rearward through channels 10 and out of the exhaust port 2. Alternatively, or in addition, the exhaust port 2 may be located at the stern side of the boat or at the bottom of the boat rather than, or in addition to, on either side of the boat at the stern end.

With reference to FIG. 2, presenting one embodiment of the cutting blade assemblies, there is preferably positioned immediately aft of the intake port 1 a primary array of cutting blades 5. It is the purpose of this first array to reduce the size and break up clumps of biomass in the large plants entering the mulching chamber 9 via the intake port 1. As the water and plant matter pass through this primary cutting blade array, a second, third and even a fourth array of blades 8 disposed in a mulching chamber 9 are contacted with the passing water and debris. It is the purpose of these secondary, tertiary and quaternary cutting blade arrays to thoroughly chop up or mulch the biomass initially cut by the primary cutting blade array. Depending on the aquatic plants to be disposed of, the cutting blades are designed either to completely mulch the plants or to only cut the plants into small enough pieces to ensure that the plants are not able to regenerate. In the case of waterhyacinths, only 5% of the mass is vegetative matter that must decompose (95% of the mass is water). It is known that the fragments do not give rise to new plants. The cutting action is achieved by rotatably mounting each array of cutting blades on a shaft such that power is transmitted to the shaft of the array so as to rotate the array. A conventional drive means is provided for this purpose which may be the same drive means for propelling the boat forward. Preferred methods for providing rotational torque to the cutting blade shafts are described in greater detail below.

Toward the rear of the mulching chamber 9, there is provided a seat for an operator of the water craft 11. All of the instrumentation and controls of the water craft are preferably placed within easy reach of this location. Important controls include steering, power and a means for starting and stopping the rotation of the arrays of cutting blades. Those skilled in the art will recognize that the precise location of the operator's seat on the boat is not critical. However, it is desirable that the operator have a good view of approaching water surface. For this purpose, it would be desirable for the operator's seat to be equipped with a seat elevation means, said means being conventional in the art. While seat location is not critical, it will be appreciated that a safe location with respect to the arrays of cutting blades is most desirable. It will also be recognized that it would be desirable for the operator to be shielded from the oncoming wind, as with a windshield, or even more preferably, from the wind, noise and heat as in an air-conditioned, noise limiting cabin. These features are conventional in the art and are not further described herein.

Behind the operator's seat, 11, a housing 12, is provided for the power means for the water craft. This power means may be a conventional internal combustion engine capable of operating on gasoline or diesel. The power means is preferably sufficiently powerful as to be able to both propel the water craft through the water rapidly while at the same time transmitting sufficient torque to the arrays of cutting blades as to efficiently mulch contacted biomass. Alternatively, as described further below, the arrays of cutting blades may preferably be provided with an independent, hydraulic source of torque.

In one aspect of the invention, specific dimensions for the water craft may be chosen. By way of example, the following specific dimensions are provided.

However, it will readily be appreciated that these are only exemplary and other dimensions are entirely acceptable and within the scope of this invention: the width of the boat, 11'-10"; housing for power means, 48"; operator's seat, 48"; dimensions of the channel connecting the mulching chamber 9 and the exhaust port 2, 12"; mulching chamber 8'-0"; distance from mulching chamber to bulkhead, 12"; distance from bulkhead to pivotal fastener means for intake port, 8"; distance from pivotal fastener means to the front of the primary cutting array, 44"; distance from the front of the primary cutting array to the bow, 20".

In one embodiment of the invention, the water craft is an airboat. According to this embodiment, the water craft is propelled forward by a motor driven fan. Such vehicles are in common use in swampy areas, such as in vast areas of Florida marshlands, where a motor churning in the water is not practical due to shallow waters and infestation with plants and other foliage that will foul a submerged propeller. In addition, the airboat is desirable because of the reduced danger of harming wildlife in the water. Naturally, however, the water craft of this invention could be a conventional submerged propeller driven boat where the foregoing concerns are not applicable or where more power than can be delivered by an airboat is required. Because the mulching system with which the boat is equipped will eliminate foliage as the boat passes through the water, fouling of a submerged propeller is minimized.

Figure 3:
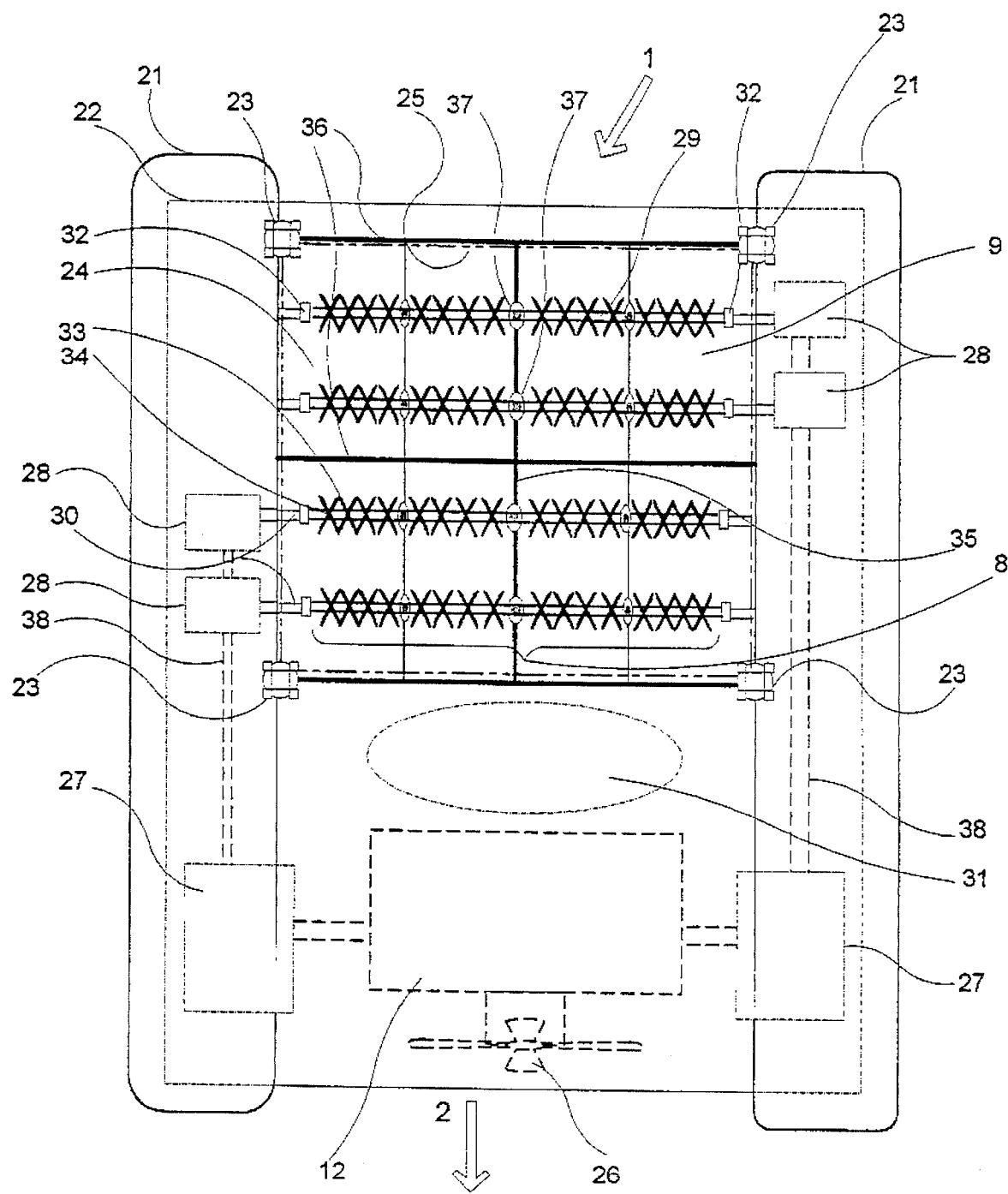
FIG. 3 is a top view of a two-hull embodiment of this invention.

Referring now to FIG. 3, in another embodiment of this invention, the intake port 1, exhaust port 2 and intermediate mulching chamber 9 are disposed between two hulls of two water crafts or between two pontoons 2 which provide sufficient buoyancy to keep the intermediate cutting assembly afloat at a desired depth or elevation in the water.

According to this embodiment, the mulching chamber 9 is formed by an upper platform 22 supporting items described in FIGS. 1A, 1B, 2A, and 2B (not shown). In this embodiment, there is no need for a loader door assembly. As the craft moves forward through plant-infested water, the mulching chamber may be brought into contact with biomass by means of hydraulic supports 23. Alternatively, the mulching chamber may be fixed in place with an open channel 24 being formed at the fore and aft ends of the mulching chamber. According to this embodiment, as the pontoons are driven forward through the water, plant-infested water flows through the channel between the pontoons, where the chopper blades mulch the biomass. It is preferred, but not critical, that a lower platform 25 be provided below the cutting blade arrays to complete the channel. The presence of a lower closure ensures that, as the blades contact biomass, the biomass is thoroughly destroyed rather than being struck only to be submerged and resurface intact. The rapid speed of blade rotation, sharpness of the blades, and angling of the blades (see below) all assist in ensuring efficient biomass destruction.

The power train for rotation of the cutting blade array(s) may be any known means for producing rotational torque. In one embodiment of this invention, torque may be applied from the engine 12 which propels motion of the water craft. Thus, in the airboat embodiment, the same engine which rotates the propeller 26 may be used to rotate the cutting blade array(s) 8 by chain coupling, belt coupling, or other conventional power transmission means.

In a preferred embodiment of this invention, a separate engine (not shown) is provided specifically to provide power through a hydrostatic transmission. In this embodiment, a dedicated diesel or gasoline engine is used to power hydrostatic pumps 27 able to deliver a sufficient number of gallons per minute (GPM) of hydraulic fluid to power hydraulic motors 28. Hydraulic fluid is circulated by the pump to the motors, with a dedicated motor serving one or more cutting arrays. Each motor may be directly coupled to the shaft 29 of each cutting blade array. The coupling means 30 is preferably one in which decoupling of the shaft and the motor occurs automatically if, for any reason, the blades strike an immovable object or otherwise are unable to freely rotate. The hydraulic fluid is circulated to and from the pump(s) and the motor(s) via high pressure hydraulic lines 38.

The primary cutting blades preferably are made to rotate at about 2,000–3,000 revolutions per minute (rpm). The torque for this rotation may be provided by, for example, a 3.3 cubic inch (cu. in.) EATON, or like hydraulic motor (50 hp, 45 GPM/2000 PSI). A variable volume piston pump, such as a 6.0 cu. in. PVH 98 VICKERS pump, which will deliver about 45 GPM at 1,780 rpm, may be used. This will require provision of about 62 hp of engine power input to the pump.

The secondary, tertiary, and quaternary blade assemblies are preferably powered, for example, by a 1.24 cu. in. EATON, or like hydraulic motor, per array, which will deliver 20 hp at 3,000 rpm at 17 GPM/2,500 PSI. This requires the variable pump to provide about 51 GPM at 2,025 rpm, and demand about 88 input hp from the dedicated engine. Thus, an engine able to produce at least about 150 hp is desirable.

The hydraulics of the power transmission system is supplied from a reservoir 31 of hydraulic fluid. An oil reservoir of about 55 gallons is adequate for the preferred embodiment disclosed herein.

Figure 4:
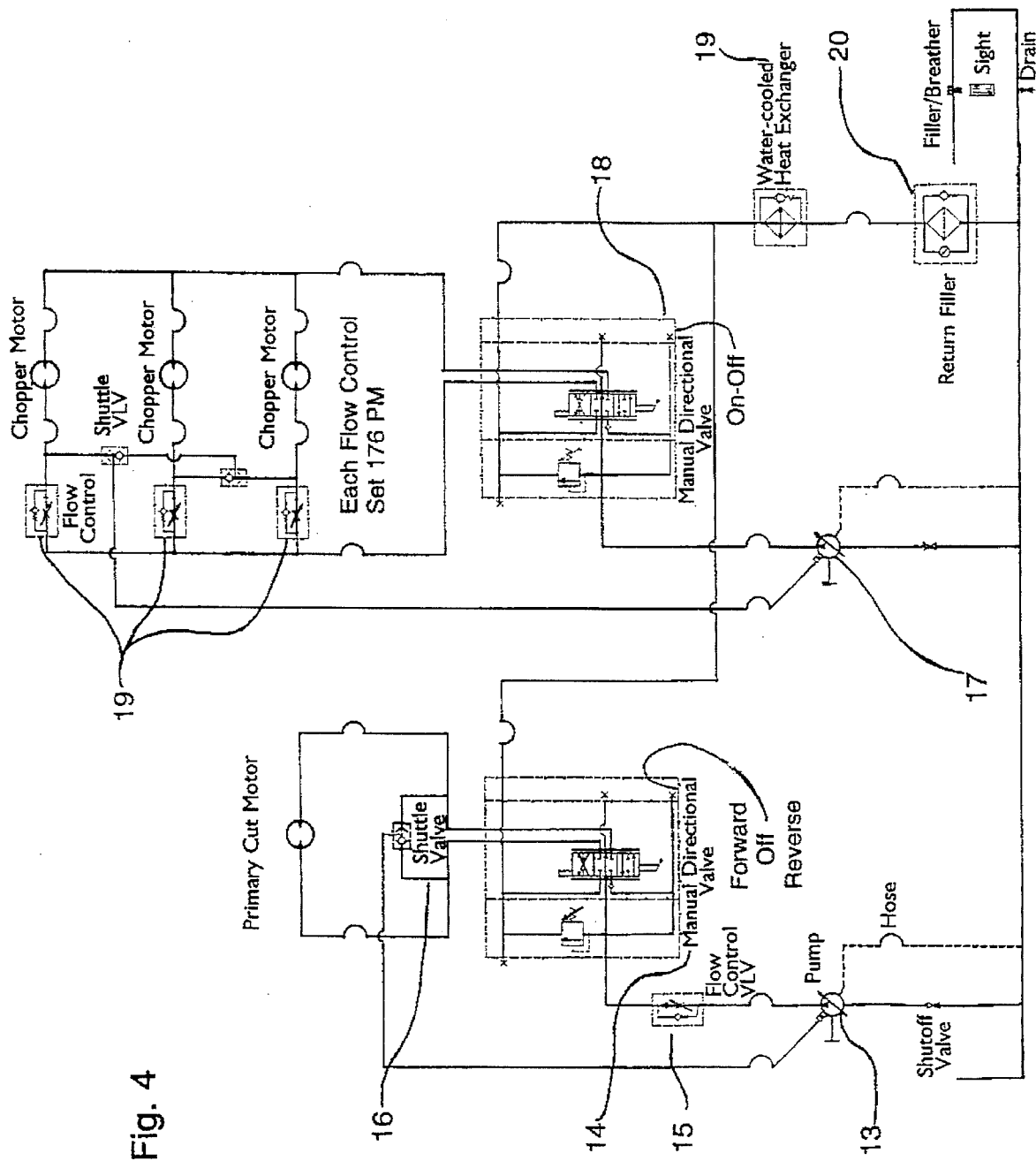
FIG. 4 is a schematic design of the hydraulics of one embodiment of this invention.

A schematic of one possible arrangement for the hydraulics, in which a primary cut motor and three secondary cut motors are separately powered by a front and a rear pump, is provided in FIG. 4. The front pump 13 has a "load-sense" control which provides flow. The flow rate delivered is zero if the Manual Directional Valve 14 is in the center "off" position. Maximum flow rate is set by a Flow Control Valve 15. The pump "senses load" via a shuttle valve 16 at direction valve work ports, and sets the pressure level at a few hundred PSI above whatever load pressure is required at the Primary Cut Motor.

The Manual Directional Valve 14 preferably contains a relief valve for system protection. This valve's spool is detented, so the handle strays where it is set. This valve allows for forward-off-reverse settings. The valve has a "motor spool" so the motor can smoothly come to a stop when the valve handle is set to the "off" position.

The rear pump 17 has a "load-sense" control which provides flow. Flow rate delivered is zero if the Manual Directional Valve 18 is in the center "off" position.

The flow rate to the Chopper Motors is set individually by Flow Control Valves 19. The pump senses the highest load via shuttle valves at outlets of Flow Control Valves, and sets the pressure level at a few hundred PSI above whatever the highest load pressure is at any Chopper Motor.

The Manual Directional Valve 18 contains a relief valve for system protection. This valve's spool detented, so the handle stays where it is set. This valve allow for on-off settings. The valve has a "motor spool" so the motors can smoothly come to a stop when the valve handle is set to the "off" position.

A Water-Cooled Heat Exchanger 19 is provided to dissipate heat developed by system inefficiency.

A Return Filter 20 maintains an acceptable cleanliness level of hydraulic fluid.

Referring back to FIG. 3, each blade array comprises a shaft 29 rotatably mounted in a bearing 32 such as a SEAL MASTER MFC24TC bearing. Preferably, the blade and bearing assembly may be raised or lowered according to where in the mulching chamber the blade array is most desirably located. Thus, the secondary array may be placed high in the chamber, the tertiary lower, and the quaternary, placed high. These positions may be varied and altered at will according to operator experience in handling particular types of biomass infestation.

The blades 33 are preferably mounted onto the shaft via removable fasteners. This may be accomplished by providing a plurality of yokes or clasps 34 which are bolted onto the shaft at regular intervals. Alternatively, the clasps may be welded to the shafts. Each clasp is provided with a plurality of brackets which are either integral to the clasps or which are bolted to the clasps, and each bracket is machined to accept one or a pair of sharp blade members 33 which may be bolted to the brackets at desirable angles. Specifically, the shaft of each array is preferably a light but strong material such as aluminum or steel, with a diameter of about one and one-quarter (1¼) inches. Blades of about 6 to 12 inches per blade are bolted to brackets attached to the clasps mounted on the shaft. Desirably, each clasp is set apart from the next a distance sufficient to allow mounting of blades of this length without adjacent blades making contact with each other's tips when the blades are set at an angle of about 10°–90° from the horizontal of the shaft. It is also desirable for alternate clasps to have brackets offset from their adjacent neighbors at intervals of about 10°–180° around the circumference of the shaft, thus allowing adjacent blades to be closer to each other and at angles closer to the horizontal, without the adjacent blades contacting each other. Several brackets may be attached to each clasp at intervals around the shaft. Preferably, between about 1–6 brackets are provided per clasp around the circumference of the shaft, with either one or two blades attached to each bracket at the desired angle.

The advantage of each blade or blade set being independently attachable to brackets bonded to clasps mounted on the shaft is that any given blade may be removed, sharpened, or replaced, without requiring disassembly of the entire array. The blades are preferably manufactured from a strong but light metal or alloy. Stainless steel or like metal is preferred.

Along the centerline of this embodiment of the water craft, a support beam 35 preferably is provided. This beam is, in turn, supported by structural members 36 which are preferably tensile beams. From the central support beam 35, a plurality of bearings 37 may be provided through which each shaft of each blade array passes. These bearings ensure adequate support of the rotating blade arrays. The structural members 35 and 36 also add strength to the water craft.

In view of the foregoing description, those skilled in the art will recognize that the water craft provided herein, whether of one or more hulls, has certain advantages and provides certain improvements in the art. One advantage of the instant water craft is appreciated from the arrangement of cutting blades between an intake port and an exhaust port, whether between a single or more hulls, such that weed-infested water is made to pass through arrays of cutting blades as the water craft proceeds through the weed-infested water. In addition, once cleared of weeds, immediate access to the waterway is provided, as opposed to chemical treatments which require some period of time before the infesting weeds die. Further, the instant craft allows for rapid progression through such waterways, allowing for speedy remediation. In a further improvement, the craft is propelled by a propulsion means which does not enter the water and thereby avoids fouling. This is accomplished by, for example, equipping the craft with a large fan as in an airboat. This eliminates fouling of propeller-type propulsion means and provides more rapid forward motion than a paddle wheel can deliver. Further aid in forward motion is achieved through the power of the rotary cutting blades, which force water and mulched debris rearward, out of the exhaust port(s), thus providing added forward thrust. In a further embodiment, the improvement of a two-hull or two-pontoon design is provided. This allows for versatility in the length of the cutting blades that can be disposed between the two hulls or pontoons, thus allowing large surface areas of infested water to be even more rapidly cleared.

It should be understood that the examples and embodiments described herein are for illustrative purposes only and that various modifications or changes in light thereof will be suggested to persons skilled in the art and are to be included within the spirit and purview of this application and the scope of the appended claims.

We claim:

1. A water craft for removing aquatic plants comprising:
   at least one hull having an intake port at the bow end of the boat whereby aquatic plant laden water enters the boat;
   an exhaust port whereby water and mulched aquatic plants are discharged; and
   at least one array of cutting blades, rotatably disposed between said intake and said exhaust ports for mulching solid matter in the water passing from said intake port to said exhaust port.

2. The water craft, according to claim 1, which is an airboat.

3. The water craft, according to claim 1, wherein the intake port is a loader door at the bow end of the hull.

4. The water craft, according to claim 1, wherein there is positioned immediately aft of the intake port a primary array of cutting blades to reduce the size and break up clumps of biomass of large plants entering the boat via the intake port.

5. A water craft for removing aquatic plants comprising:
   at least one hull having an intake port at the bow end of the boat whereby aquatic plant laden water enters the boat;
   an exhaust port whereby water and mulched aquatic plants are discharged;
   at least one array of cutting blades, rotatably disposed between said intake and said exhaust ports for mulching solid matter in the water passing from said intake port to said exhaust port; wherein there is positioned immediately aft of the intake port a primary array of cutting blades to reduce the size and break up clumps of biomass of large plants entering the boat via the intake port;
   wherein water and plant matter passing through said primary cutting blade array is brought into contact with one to several additional arrays of cutting blades disposed in a mulching chamber so as to thoroughly chop or mulch the biomass initially cut by the primary cutting blade array.

6. The water craft, according to claim 5, wherein, toward the rear of the mulching chamber, there is provided a seat for an operator of the water craft from which all of the instrumentation and controls of the water craft are within easy reach.

7. The water craft according to claim 1 wherein said cutting blades are made to rotate by hydraulic motors.

8. The water craft, according to claim 1, wherein the intake port, the exhaust port, and the at least one array of cutting blades are disposed between two hulls or pontoons.

9. The water craft, according to claim 8, which is an airboat.

10. The water craft according to claim 8 wherein the at least one array of cutting blades are made to rotate by hydraulic motors.

* * * * *

UNITED STATES PATENT AND TRADEMARK OFFICE
CERTIFICATE OF CORRECTION

PATENT NO. : 5,542,240
DATED : August 6, 1996
INVENTOR(S) : Trent G. Snider; Danny G. Snider It is certified that error appears in the above-indentified patent and that said Letters Patent is hereby corrected as shown below:

Column 4, Line 5: "intakes port" should read --intake port--.

Column 6: Line 22: "pontoons 2" should read --pontoons 21--.

Signed and Sealed this

Twelfth Day of November, 1996

Attest:

BRUCE LEHMAN

Attesting Officer      Commissioner of Patents and Trademarks